April 21, 1942.  C. W. MOTT ET AL  2,280,342
ADJUSTING MECHANISM
Filed March 26, 1940  2 Sheets-Sheet 1
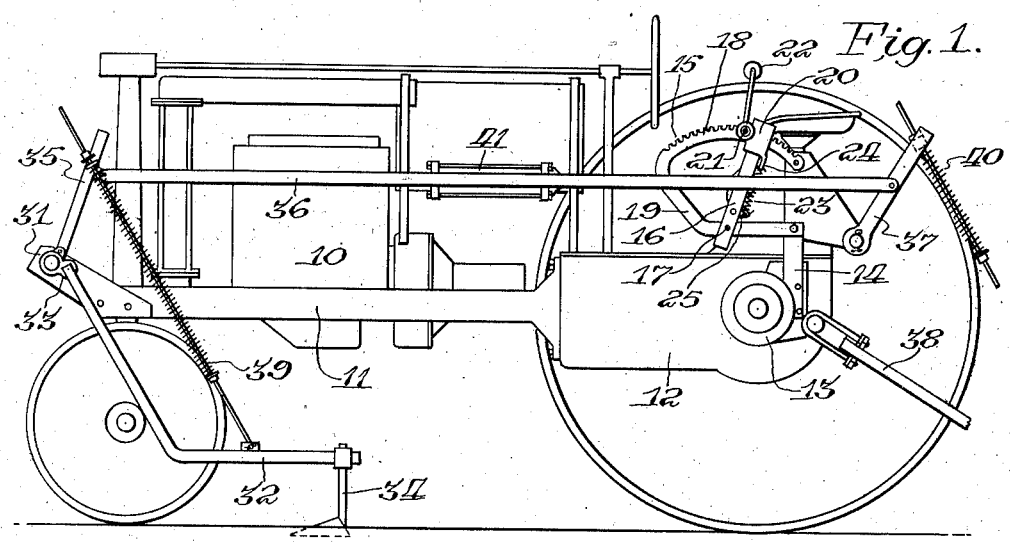
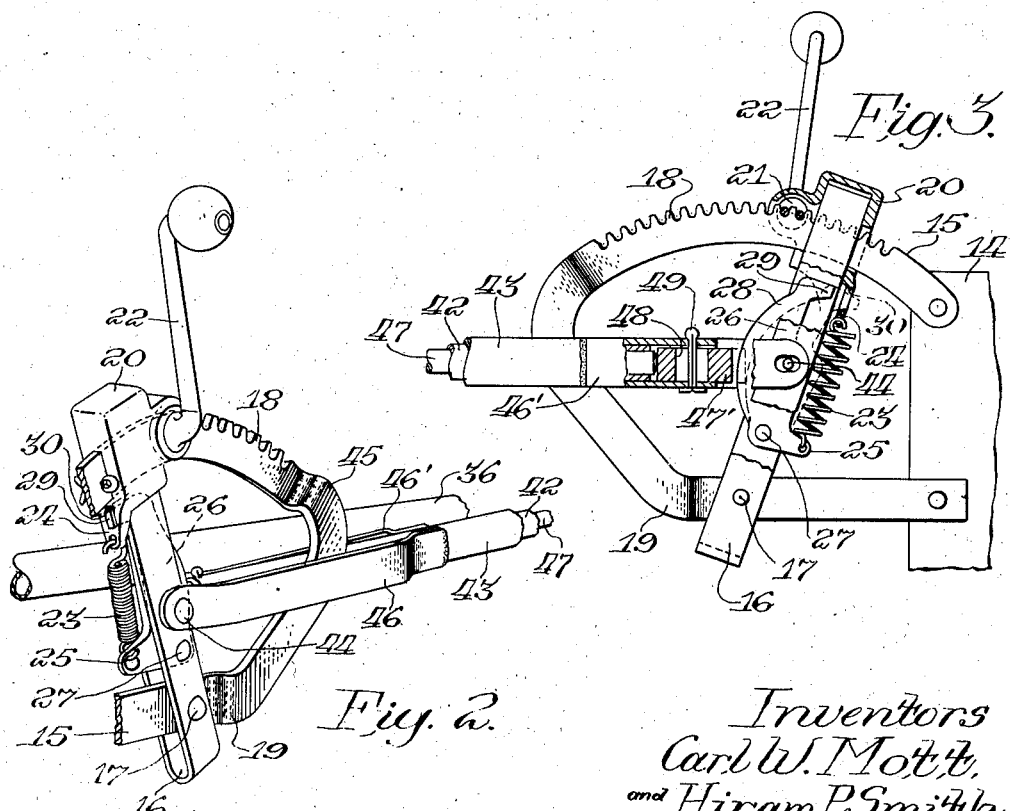
Inventors
Carl W. Mott
and Hiram P. Smith
By Paul O. Pippel, Atty.

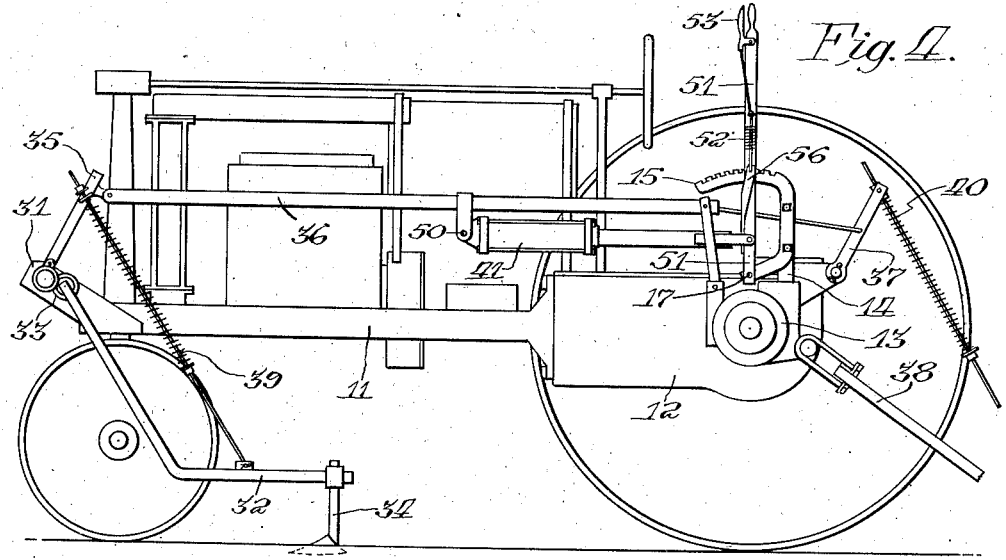

Patented Apr. 21, 1942

2,280,342

UNITED STATES PATENT OFFICE 2,280,342

ADJUSTING MECHANISM

Carl W. Mott, La Grange, and Hiram P. Smith, Canton, Ill., assignors to International Harvester Company, a corporation of New Jersey Application March 26, 1940, Serial No. 326,061

18 Claims. (Cl. 97—50)

This invention relates to adjusting mechanisms and more particularly to adjusting mechanisms for controlling the working position of implements which are carried directly on tractors and movable from one position to another by power means.

The principal object of the present invention is to provide a locking arrangement whereby the manual adjusting means, adapted for adjusting the position of the implement with respect to the ground when in its ground-working position, will be automatically locked when the implement is moved to its transport position by lifting means independent of the manual adjusting means.

It is another object of the invention to provide a simple and effective arrangement of the association of the manual adjusting means with relation to the power lifting device.

According to the present invention, there is associated with the usual manual adjusting means a means incident to the operation of a cylinder power device which will effect locking of the usual latch means forming the part of the adjusting means, when the implement is lifted to the transport position. The power lift device takes the form of a cylinder and the adjusting mechanism is so arranged with respect to the power lift device that adjustment of the implement is effected by the adjusting means serving as an adjustable stop, and wherein the cylinder lift device, upon effecting adjustment of the implement in the ground, is bodily moved upon making the depth adjustment.

For other objects and a better understanding of the features of the present invention, reference may be had to the following detailed description taken in connection with the accompanying drawings, in which:

Figure 1 is a view in elevation of a tractor with one traction wheel removed and showing the organization of the implement power lift device and adjusting mechanism in their connection to the same;

Figure 2 is a perspective view of the adjusting and locking mechanism as shown in Figure 1;

Figure 3 is a view in elevation and partly in section of the same adjusting mechanism shown in Figures 1 and 2;

Figure 4 is a view in elevation similar to Figure 1, but showing a modified form of lock adjusting mechanism;

Figure 5 is a perspective view of the locking and adjusting mechanism shown in Figure 4;

Figure 6 is a view in elevation, partly in cross-section, of the lock and adjusting mechanism shown in Figures 4 and 5; and, Figure 7 is a plan view, partly in section, taken along the line 7—7 of Figure 6.

Referring now particularly to Figure 1, there is shown a tractor or implement-carrying frame 10, having the usual side bars 11 and the transmission and differential housing 12. Extending laterally from the transmission and differential housing are transverse axle housings 13 to which may be connected a vertical supporting structure 14 on which is supported a forwardly extending quadrant 15 forming a part of the adjusting mechanism.

Referring now more particularly to Figures 2 and 3, it should be noted that the quadrant 15 has associated with the same a manually adjustable lever 16 pivotally connected to the quadrant by a pin 17 and adapted to run over the tooth portions 18 of the quadrant. As seen more readily in Figure 2, the lever means 16 takes the form of a U-shaped member having spaced portions adapted to enclose the portion 19 of the quadrant and to extend upwardly above the tooth portions to have associated with the same a slidable latch or cap means 20. The lever is made to move over the quadrant by the rotation of a pinion 21 by means of a hand crank 22, this specific construction forming a part of the invention covered in the patent application of Carl W. Mott, Serial No. 251,773 and filed January 19, 1939, which matured into Patent No. 2,228,500, issued January 14, 1941. The latch means 20 is biased in its latching position by a tension spring 23 connected to a depending projection 24 on the latch means 20 and a projection 25 of a lock element 26 pivoted at 27 to the lever 16 between its spaced portions. The lock element 26 takes the form of a lever having not only the projection 25, but also an arm portion 28 with a locking projection 29 adapted to protrude into a slot 30 formed in the depending projection 24 of the latch means. Normally, when the element 26 is not influenced by forces other than the spring, it is kept out of locking engagement by the action of the same pulling on the projection 25.

On the side bars 11 and extending forwardly thereof is an implement supporting structure 31 to which the implement 32 is pivotally connected at 33. The implement 32 has the ground-working tool 34 thereon. On this implement supporting structure 31 is pivoted a lifting lever 35 adapted to be moved fore and aft by a lifting pipe 36 extending longitudinally rearwardly for support on a rear pivotal lever 37 pivoted on the vertical supporting structure 14. Also connected to the rear supporting structure 14 is a rear implement 38. The respective implements 32 and 38 are adapted to be lifted upon forward movement of the lifting pipe 36 and the levers 35 and 37, through connections with the lifting levers respectively by means of the usual lifting rods 39 and 40. As the lifting pipe 36 moves forward, both implements will thereby be lifted.

For the moving of these implements from their ground-working position to the transport position, there is provided a power lift cylinder device 41 adapted to be connected at one point to the lifting pipe 36 and supported at another point by the lever 16 of the manual adjusting mechanism. The cylinder device is adapted to be operated by a hydraulic pump and control arrangement similar to that shown in the patent application of A. C. Lindgren and Carl W. Mott, Serial No. 181,778, filed December 27, 1937 which issued September 3, 1940 as Patent No. 2,213,401. For an understanding of the present invention, it is not believed that further description of the means for operating the cylinder is necessary. The cylinder 41 is substantially the same in detailed structure as that covered in the patent application of Carl W. Mott, Serial No. 222,739, now Patent No. 2,194,209, March 19, 1940, and includes and forms a part of the cylinder portion of the device; a projecting sleeve 42 connecting the cylinder device to the adjusting mechanism fitting into a supporting pipe sleeve 43 pivoted at 44 to the lever 16. It should be noted that the quadrant portion 18 is offset from a portion 45 thereof, whereby the portion 45 is positioned to one side of the pipe 43. The connection of the pipe 43 to the lever is made through straps 46 and 46' welded forwardly of the portion 45 to the pipe 43. The strap 46 is outside the portion 45, whereby the sleeve 43 will be retained against lateral play to thereby provide steadying means to the equipment, and adapted to have pivotal movement only in a vertical direction about the pivot 44.

Within the sleeve 42 an axially movable piston rod 47 is adapted to operate. While the sleeve 42 extends but a little way within the pipe 43, the piston rod 47 on the other hand extends a considerable distance and through the entire length of the pipe sleeve 43, so that it may contact a plug 47' which, in turn, contacts the lock element 28 upon operation of the cylinder device. The plug has a slot 48 adapted to limit its movement within the pipe 43. However, the slot 48 is of sufficient length not to hinder the contacting of the end of the plug 47' with the lock element 26. Passing through the pipe 43 and into the slot 48 is a cotter pin 49. The plug 47' is of sufficient diameter and is provided to give a good contacting surface for engagement with the lock element 26. This plug also fits somewhat loosely in the sleeve 43 to maintain its fair contact with the lock element, regardless of the angular adjustment between the lever and the sleeve 43.

As the cylinder device 41 is operated, the end of the piston rod 47 will abut against the plug 47' to effect locking of the projection 29 into the slot 30 in the depending projection 24 of the latch means 20. When this engagement is made, the cylinder device, upon continuing its operation, will effect lifting of the elements. It should now be apparent that automatic locking means has been provided for preventing the operation of the manual adjusting means upon the implements being lifted to their transport position. This locking is desired to prevent unlatching of the adjusting mechanism due to any looseness that may be present in the arrangement that would permit the adjusting mechanism from getting out of its original adjustment. Thus, the implement is always returned to its original setting when lowered to its working position.

When fluid is released from the cylinder 41 to permit lowering of the implements to their ground-working position, the end of the piston rod 47 will leave its contact with the locking element 26 and the locking element 26 will be returned to its normal position by the spring 23. The latch means will then be no longer positively retained against vertical movement.

Referring now to Figures 4 to 7, there is shown a modified form of the invention. It will be noted that, particularly as to Figure 4, the various parts for effecting lifting of the implement and the implements themselves are similar to the showing in Figure 1. As to these parts, the same numerals may be applied. However, the cylinder 41 is connected to the lifting pipe 36 at a point immediately under the same, as shown at 50, instead of at the side thereof, as in Figure 1.

The adjusting lever 51 in this form of the invention is similar to the more usual adjusting lever and has a latch means 52 adapted to be operated by a hand portion 53 in the well known manner. The connection of the cylinder device 41 with the lever by means of the pipe sleeve 43 is identical with that shown in the previous form of the invention, but, instead of having a pivoted lock element, there is provided a slidable lock element 56 projecting downwardly from its connection with the latch means 52 to slide vertically along the forward face of the lever 51. The locking element 56 is similarly engaged by the forward end of the piston rod 47 physically to hold the same from movement in a vertical direction when the power lift is operated. The lock element 56 may be and is preferably welded to the latch means, as indicated at 57. The pressure of the piston rod 47 against the lock element 56 and forward face of the lever is very high, and actual operation of the latch means 52 is positively prevented. The quadrant is of different form, and, since it does not have an offset portion, the straps 46 and 47 connecting the pipe sleeve 43 to the lever may be of different form. In both forms the straps are welded to the pipe sleeve as indicated in the drawings.

It should be apparent that a locking mechanism has been provided for preventing the operation of an adjusting lever while the power lift is in operation. Such an arrangement will prevent anyone from varying the ground-working adjustment previously made when the implements were in their ground-working position. Not only will it prevent operation of the lever by an outsider, but it will also prevent movement of the lever 51 over its quadrant which might be caused due to rattling of the equipment as the same is being carried in transport position. It should also be apparent that such an arrangement in its connection with a cylinder lift power device is of simple and efficient construction and that connection of the power lift device may be readily made with the adjusting mechanism without the necessity of giving attention to making the connection with the lock element, the lock element being carried by the adjusting mechanism.

While various changes may be made in the detailed construction, it shall be understood that such changes shall be made within the spirit and scope of the appended claims.

What is claimed is:

1. In combination, a tractor, an implement connected to the tractor for movement from one position to another position, a power operable device connected to the implement to move the same, manual means for adjusting the implement when in one of its positions, and means incident to the operation of the power device for rendering the adjusting means inoperative when the implement is moved to the other of its positions.

2. In combination, a tractor, a ground-working implement connected to the tractor for vertical movement to and from its ground-working position, a power lift device carried by the tractor and connected to the implement to lift the same, manual means for adjusting the working depth of the implement, and means incident to the operation of the power device for rendering the adjusting means inoperative after the implement has been lifted from its ground-working position.

3. In combination, a tractor, an implement connected to the tractor for movement from one position to another position, a power device connected to the implement to move the same, manual means for adjusting the implement in one of its positions, and means operable by the operation of the power device upon moving the implement to its other position to render the adjusting means inoperative in the latter position.

4. In combination, a tractor, a ground-working implement connected to the tractor to be lifted from a ground-working position to a transport position, means for lifting the implement to its transport position, manual means for adjusting the working depth of the implement, and means incident to the operation of the lifting means for automatically and positively locking the adjusting means when the implement is lifted to its transport position to thereby prevent the same from getting out of its original adjustment while the implement is being transported.

5. In combination, a tractor, a ground-working implement connected to the tractor to be lifted from a ground-working position to a transport position, a power-lift device carried by the tractor and connected to the implement to lift the same to its transport position, manual means for adjusting the working depth of the implement, and means incident to the operation of the power-lift device for automatically locking the adjusting means upon the lifting of the implement to its transport position to thereby prevent the same from getting out of its original adjustment while the implement is being transported.

6. In combination, a tractor, a ground-working implement connected to the tractor for vertical movement from a ground-working position to a transport position, means for lifting the implement to its transport position, manual means for adjusting the working depth of the implement comprising a quadrant, a lever adjustable over the quadrant, latch means associated with the lever for normally retaining the lever in its adjusted position over the quadrant, and means incident to the operation of the lifting means for positively locking said latch means when the implement is lifted to its transport position.

7. In combination, a tractor, a ground-working implement connected to the tractor for vertical movement from a ground-working position to a transport position, means for lifting the implement to its transport position, manual means for adjusting the working depth of the implement comprising a quadrant, a lever adjustable over the quadrant, and latch means associated with the lever for normally retaining the lever in its adjusted position over the quadrant, means incident to the operation of the lifting means for positively locking said latch means when the implement is lifted to its transport position, said lifting means having a movable part, and said incident means including a locking element adapted lockingly to engage the latch means forming a part of the manual adjusting means and adapted to be actuated by the movable part of said lifting means, and biasing means arranged normally to keep said lock element out of engagement with the latch means.

8. In combination, an implement-carrying frame, an implement connected to the implement-carrying frame for movement from one position to another position, manual means for adjusting the implement in one of its positions, means for moving the implement from one position to the other, and means incident to the operation of the moving means for locking the adjustable means when the implement is moved to its other position.

9. In combination, a supporting member, a second member carried by the supporting member and adapted for movement from one position to another position, means for moving the second member from one position to the other, manual means for adjusting the second member in one of its positions, and means incident to the operation of the moving means for locking the adjusting means when the member is moved to its second position.

10. In combination, an implement-carrying frame, an implement connected to the implement-carrying frame for movement from one position to another position, means for moving the implement with respect to said frame, manual means for adjusting the implement in one of its positions comprising a quadrant, a lever adjustable over the quadrant, and latch means associated with the lever for normally retaining the lever in its adjusted position over the quadrant, and means incident to the operation of the lifting means for effectively retaining said latch means in its adjusted position when the implement is moved to another position.

11. In combination, an implement-carrying frame, an implement connected to the implement-carrying frame for movement from one position to another position, means for moving the implement with respect to said frame from the one position to the other position, manual means for adjusting the implement in the one position comprising a quadrant, a lever latch means including a biasing means carried by the lever and adapted to hold the lever in its adjusted position with respect to the quadrant, and means incident to the moving means for locking the latch means to retain the lever in its adjusted position comprising a pivoted lock element on said lever adapted to be operated by the moving means and connected to the biasing means forming a part of the latch means to be normally held out of locking engagement with the latch means, whereby said biasing means serves the double purpose of retaining the latch means and holding the locking element against locking engagement.

12. In combination, an implement-carrying frame, an implement connected to the implement-carrying frame for movement from one position to another position, means for moving the implement with respect to said frame from the one position to the other position including a rod member adapted to have axial movement, manual means for adjusting the implement in the one position comprising a quadrant, a lever and latch means for holding the lever in its adjusted position over the quadrant, and means incident to the operation of the moving means and adapted to be actuated by the rod member for locking the latch means to retain the lever in its adjusted position when the implement is moved to the other position.

13. In combination, an implement-carrying frame, an implement connected to the implement-carrying frame for movement from one position to another position, a power cylinder device including a piston rod for moving the implement, manual means for adjusting the implement in one of its positions comprising a quadrant, a lever, and a latch means for holding the lever in its adjusted position over the quadrant, and locking means adapted to be actuated by the piston rod when the cylinder device is operated to lock the latch means for holding the lever in its adjusted position when the implement is moved to its other position.

14. In combination, an implement-carrying frame, an implement connected to the implement-carrying frame for movement from one position to another position, a power cylinder device for moving the implement and including a piston rod, manual means for adjusting the implement in one of its positions comprising a quadrant, a lever and latch means for retaining the lever in its adjusted position, and a pipe sleeve pivotally connected to the lever for receiving the piston rod of the cylinder device.

15. In combination, an implement-carrying frame, an implement connected to the implement-carrying frame for movement from one position to another position, a power cylinder device for moving the implement and including a piston rod, manual means for adjusting the implement in one of its positions comprising a quadrant, a lever and latch means for retaining the lever in its adjusted position, a pipe sleeve pivotally connected to the lever for receiving the piston rod of the cylinder device, said cylinder device being readily removable from its attachment to said sleeve, locking means adapted to be actuated by the piston rod when the cylinder device is operated to lock said latch means, a loosely fitted plug in said pipe sleeve adapted to contact with the locking means, and said piston rod contacting said plug to engage the same with the locking means.

16. In combination, an implement-carrying frame, an implement connected to the implement-carrying frame for movement from one position to another position, a power cylinder device for moving the implement including a piston rod, manual means for adjusting the implement in one of its positions comprising a quadrant, a lever, and latch means for retaining the lever in its adjusted position over the quadrant, a locking element for holding the latch means carried by the lever, and a pipe sleeve connected to said lever and arranged to receive the piston rod so that it may actuate the lock element upon the power device being operated to move the implement to its other position.

17. In combination, an implement-carrying frame, an implement mounted on said implement-carrying frame for movement from one position to another position, a power device including an axially movable rod member, manual means for adjusting the implement in one of its positions including a quadrant, lever means associated with the quadrant and having spaced portions, and latch means carried by the lever, a lock element pivoted between the spaced portions of the lever and adapted to engage the latch means, and a pipe sleeve pivoted to said lever so that its opening therethrough is in alinement with the pivoted lock element between the spaced portions of said lever means and receiving said axially movable rod member for the actuation of said lock element upon operation of said power device whereby the manual means will be automatically locked in its adjusted position.

18. In combination, an implement-carrying frame, an implement mounted on said implement-carrying frame for movement from one position to another position, a power device including an axially movable rod member, manual means for adjusting the implement in one of its positions including a quadrant, lever means associated with the quadrant and having a face portion in the direction of the implement, and latch means carried by the lever, a pipe sleeve pivoted to said lever so that its opening therethrough is in alinement with the face portion of the lever and receiving said axially movable rod member, and a locking element connected with said latch means and adapted to extend over said face portion to be abutted by the end of said rod member to be forced against said face portion upon actuation of the power device, whereby said manual means will be retained in its adjusted position when the implement is moved from the one position to another position.

CARL W. MOTT.
HIRAM P. SMITH.